Sept. 29, 1936.  W. B. NORMELLI  2,055,669
INTERMITTENTLY OPERATING ABSORPTION REFRIGERATOR
Filed May 13, 1931  7 Sheets-Sheet 1

Inventor
Wulff Berzelius Normelli
by Knight Bros
attorneys

Sept. 29, 1936.  W. B. NORMELLI  2,055,669
INTERMITTENTLY OPERATING ABSORPTION REFRIGERATOR
Filed May 13, 1931   7 Sheets-Sheet 4

Inventor
Wulff Berzelius Normelli
by
Knight Bros, attorneys

Sept. 29, 1936.    W. B. NORMELLI    2,055,669
INTERMITTENTLY OPERATING ABSORPTION REFRIGERATOR
Filed May 13, 1931    7 Sheets-Sheet 6

Patented Sept. 29, 1936

2,055,669

UNITED STATES PATENT OFFICE 2,055,669

INTERMITTENTLY-OPERATING ABSORPTION REFRIGERATOR

Wulff Berzelius Normelli, Berlin-Charlottenburg, Germany

Application May 13, 1931, Serial No. 536,997
In Switzerland September 19, 1929

40 Claims. (Cl. 62—118)

Application has been filed in Switzerland September 19, 1929.

In the case of refrigerators of the intermittently operating type using solid absorption substances, the problem of conducting away the heat liberated during the absorption is rather difficult to cope with because the solid absorbing substance does not circulate as a liquid absorbent would, and a considerable temperature drop withm in the solid absorbing substance must be prevented because, if the heat is conducted away to the air, the temperature is bound to rise higher than is the case with cooling by flowing water, especially in summer.

The present invention solves the problem by imparting the heat which is liberated when the refrigerating medium is absorbed by the solid absorbing substance to a liquid auxiliary substance which, in its turn, imparts it to an air-cooled heat accumulator. As the latter is not subject to high pressure, it can be made of thin material so that it is even easier to dissipate the heat into the open. Further, the conducting away of heat is not restricted to the absorption period, but is distributed over a long time because the heat accumulator is able to store up the heat derived from the absorption process. The heat can, however also, be made use of for various domestic purposes, for heating up geysers, for instance.

The temperature in the heat accumulator is determined by the action of the surfaces conducting away the heat. The dimensions of these surfaces are such that the temperature in the heat accumulator cannot rise beyond a certain permissible limit, even if no hot water is taken from it.

The invention is especially adapted to refrigerators operating with solid absorption substances, as described in my copending applications for patents Serial Nos. 245,575 and 387,221.

The invention further covers a number of practical possibilities of conducting away the heat of absorption and condensation. Further details of the invention will be described in the description of the illustrations attached.

In these illustrations

Figure 4:
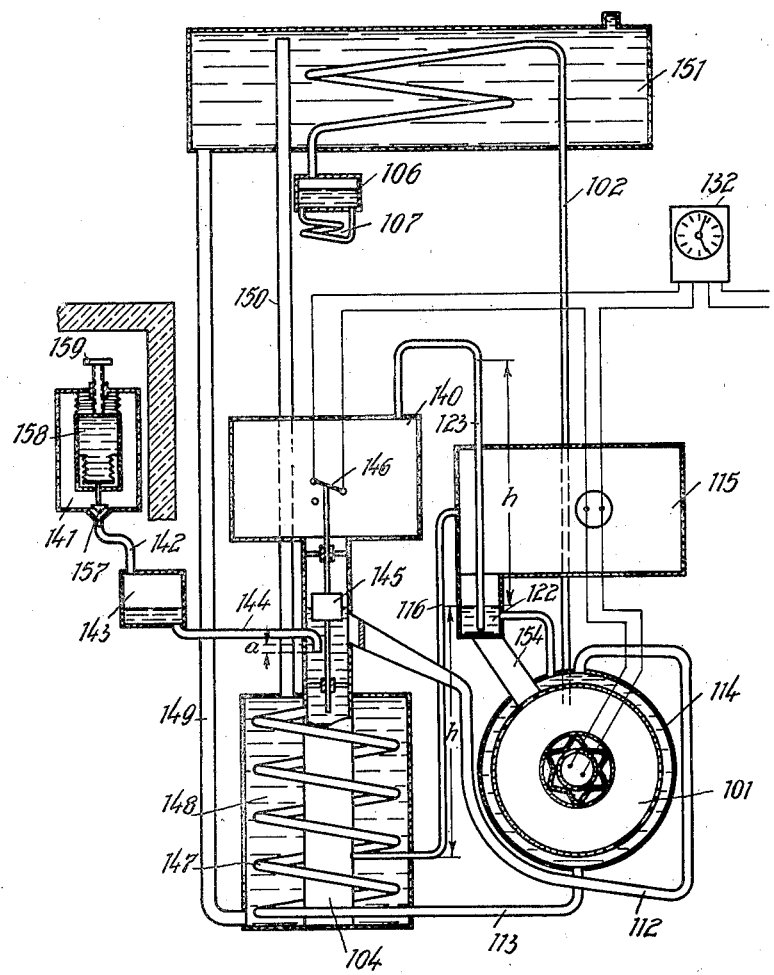
Fig. 4 shows a further modification of the refrigerating system in diagrammatic form.
Figure 5:
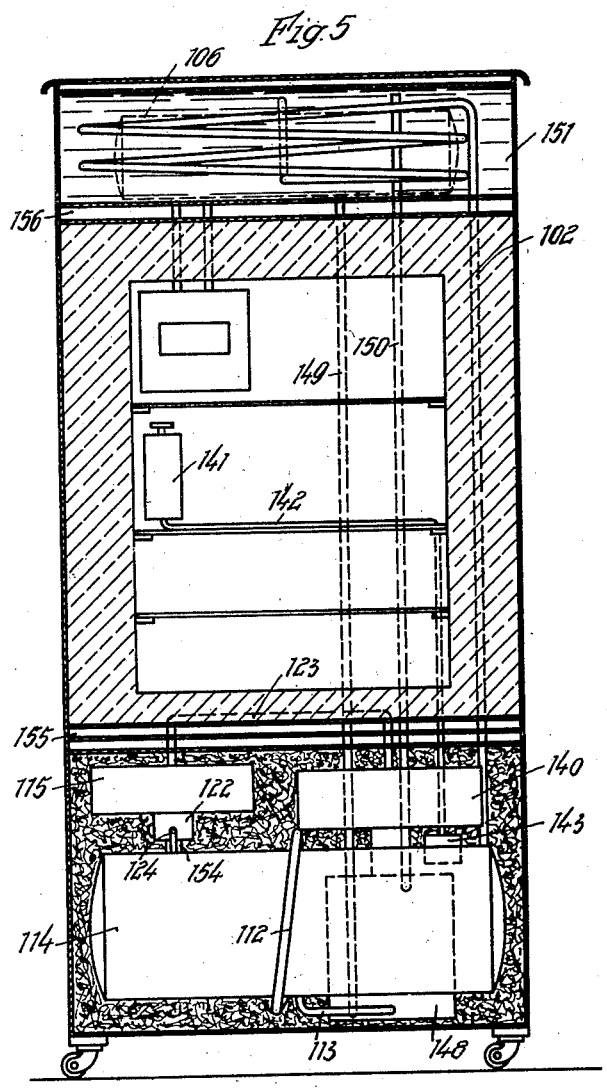
Figure 6:
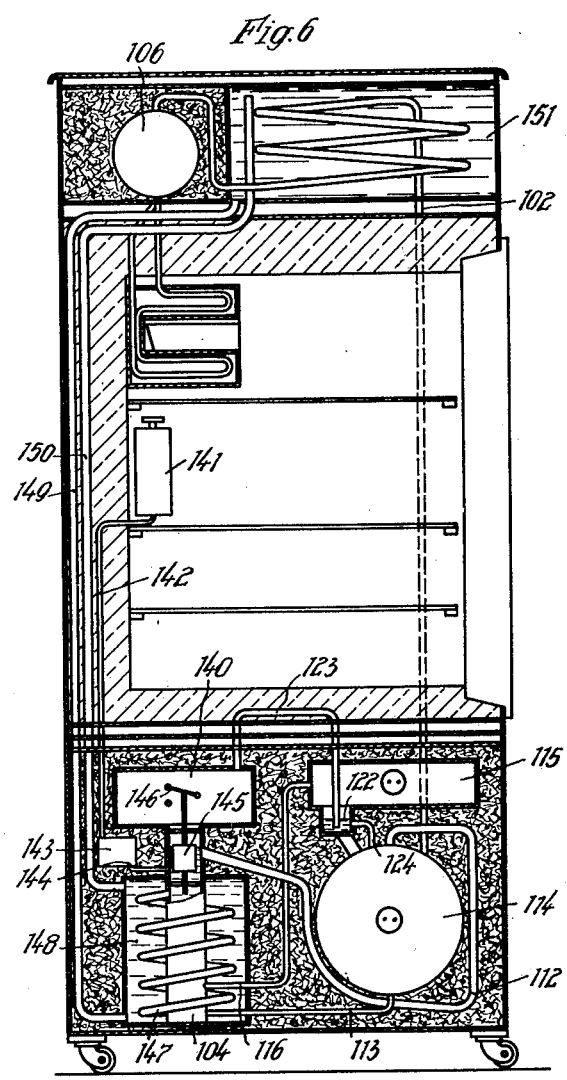
Figure 7:
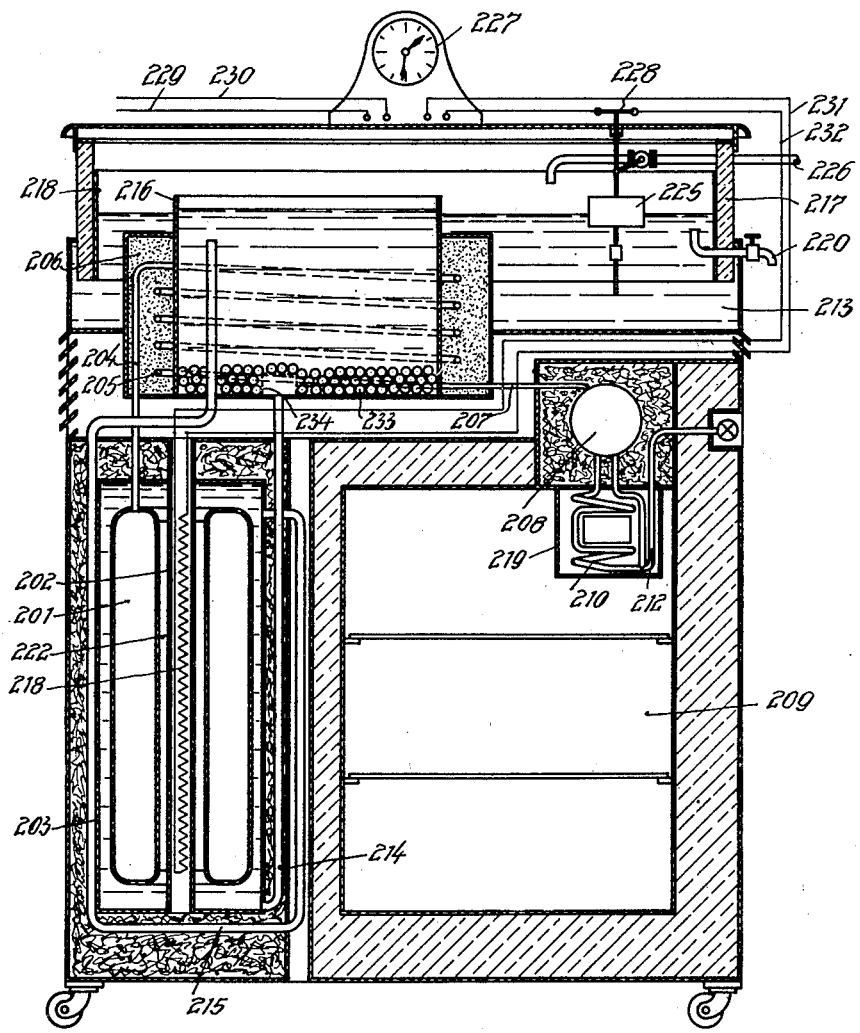

Figs. 5 and 6 show the modification Fig. 4 embodied in a domestic refrigerator, Fig. 5 showing a front elevation with the front wall removed, and Fig. 6 showing a side elevation with the side wall removed and certain of the constituent elements being shown in section, and Fig. 7 shows in front elevation a further modification of a domestic refrigerator, the front wall being removed and certain elements being shown in sectional elevation.

Figure 1:
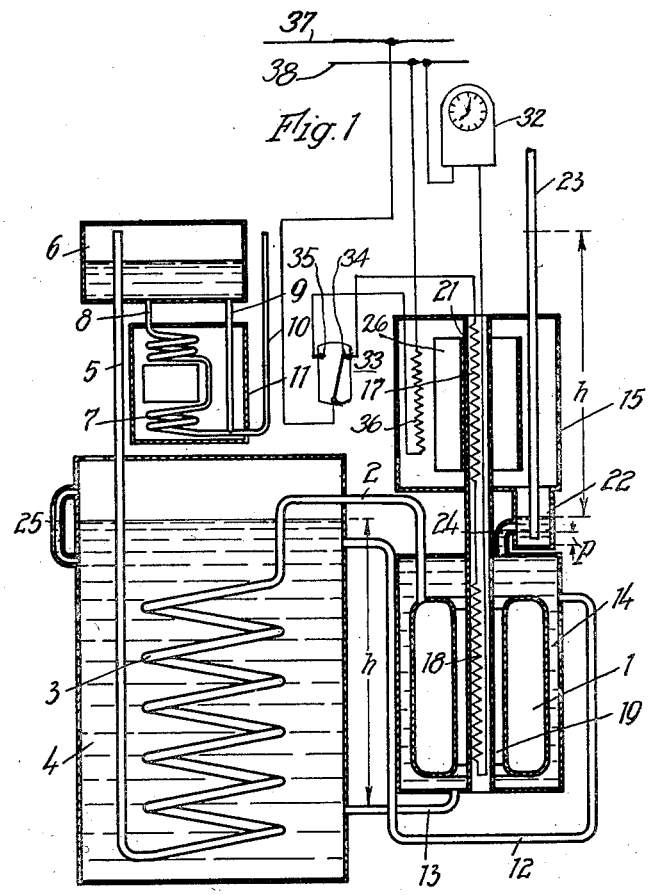
Fig. 1 is a schematic drawing of a refrigerator embodying the novel ideas involved in the present invention, and serving as an explanatory diagram.

Referring to Fig. 1, 1 is the boiler absorber which is connected to condenser 3 by pipe 2. The condenser is placed in tank 4 for the auxiliary liquid. From condenser 3 a pipe 5 leads to refrigerant storage tank 6 to which evaporator coil 7 is connected by pipes 8 and 9. The lower end of the evaporator coil is connected to pipe 10. This pipe is provided for connecting up a tank not shown in the drawings in which the ammonia is boiled at the highest possible temperature (250 degrees centigrade, for instance) before the apparatus is finished. This frees the refrigerant of water and air. The evaporator coil is in cold accumulator 11 which is preferably filled with a liquid whose freezing point is anywhere between 0 degrees centigrade and —10 degrees centigrade, as, for instance, a glycerine water solution with or without alcohol. In cold accumulator 11 there is an aperture for introducing an ice freezing box. Boiler absorber 1 is disposed in tank 14 which can be constructed as a cooling jacket. Its upper part is connected to the top of container 4 by a pipe 12, while a second pipe 13 connects the bottoms of the tanks. 15 is a tank containing the gas (air, for instance) required for expelling the auxiliary liquid. Heating wires 17 and 18 in pipe 21 are used for supplying the outside heat, required for the process. In air tank 15 is provided a corrugated iron radiator 26 which is attached to the heating tube. Thus the heat generated by unit 17 can be rapidly imparted to the air in tank 15 surrounding the radiator.

Heating pipe 21 is connected to boiler absorber 1 by a piece of corrugated iron 19 which effects good transmission of the heat. In the bottom of the air tank a liquid seal 22 acting as a shut-off valve is provided. From the latter a pipe 24 leads to cooling jacket 14. Further a tube 23 which is open at its free end is connected to this liquid seal.

The operation is as follows: When the boiling period commences, the air in tank 15 is heated up by wire 17 causing it to expand. The increased pressure forces the whole of the auxiliary liquid out of cooling jacket 14 into tank 4. The pressure in the air tank causes the water column in pipe 23 to rise to the height marked "h". "h" corresponds to the head of the auxiliary liquid in tank 4 over the opening of pipe 13. If the pressure in the air tank continues to increase, the air is forced out of the lower end of pipe 13 and escapes through the auxiliary liquid in tank 4.

When the boiling is over, the air in tank 15 and cooling jacket 14 gradually cools so that the pressure in the air tank decreases, allowing the auxiliary liquid to re-enter the cooling jacket. In so doing, it is partly evaporated on coming into contact with the heated parts of the boiler absorber. The steam passes through pipe 24 into air tank 15 where it is condensed. The condensate accumulates in liquid seal 22 and, when the level of the liquid in the seal exceeds "p", it passes back into the cooling jacket through pipe 24. When cooling jacket 14 is completely filled with the auxiliary liquid, the cooled air in tank 15 contracts to a greater extent than before, because the boiling was accompanied by the expulsion of a certain quantity of air through tube 13 and out into the open through tank 4. The partial vacuum thus obtained causes the liquid to rise in pipe 24 and drop correspondingly in pipe 23 until finally the seal at its end is broken. The dimensions of liquid seal 22 are such that every decrease in the air pressure is accompanied by a replenishment of air in tank 15 by suction through pipe 23. Thus the loss is compensated because the original quantity of air is obtained again. In this manner equilibrium is reached.

The auxiliary liquid which completely fills the cooling jacket and is heated in it, now circulates between this jacket 14 and tank 4 through pipes 12 and 13 so that the heat which is liberated when the refrigerating medium is absorbed is conducted from the cooling jacket into tank 4. Pipe 12 is best arranged in such a manner that its rising part is conducted close to the cooling jacket so that an additional buoyancy is obained when the heat passes from the wall of the tank to the tube, thus starting the circulation of the liquid.

As will be seen from the schematic drawings, the arrangement of the tanks 4, 14, and 15 is such that when the refrigerator is shut off, the auxiliary liquid is at the levels shown in the different tanks. Thus, every time a boiling period is over, the liquid seal at the bottom end of tank 15 is filled automatically. The volume of the liquid in seal 22 in this case must be in accordance with the following equation $$V > \frac{d^2 \pi}{4} h$$

$d$ being the diameter of pipe 23, $h$ the active head of this pipe above the normal water level. From this condition the minimum dimensions of seal 22 can easily be calculated.

The refrigerator protects itself when unusual conditions of service begin to prevail, for example, when the regulation of the heating equipment does not act correctly. It might be possible, for instance, that the boiling period is not interrupted as soon as the time is up because something has gone wrong with the time switch. It might then happen that continuous heating would result in the liquid in seal 22 and pipe 23 boiling out of pipe 23. In this manner a direct connection between the high-pressure air container with the outer air is effected, and the pressure can equalize. Thus an irregularity of this kind cannot prove a danger to the refrigerator.

Figure 2:
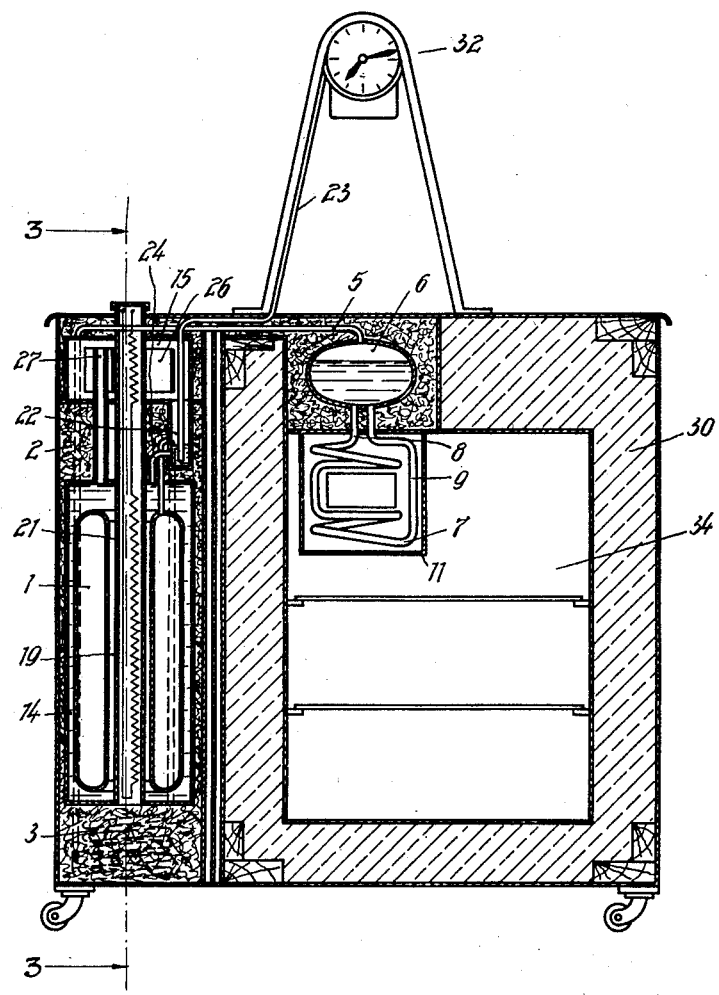
Fig. 2 shows a longitudinal vertical section through a domestic refrigerator on line 2—2 Fig. 3.
Figure 3:
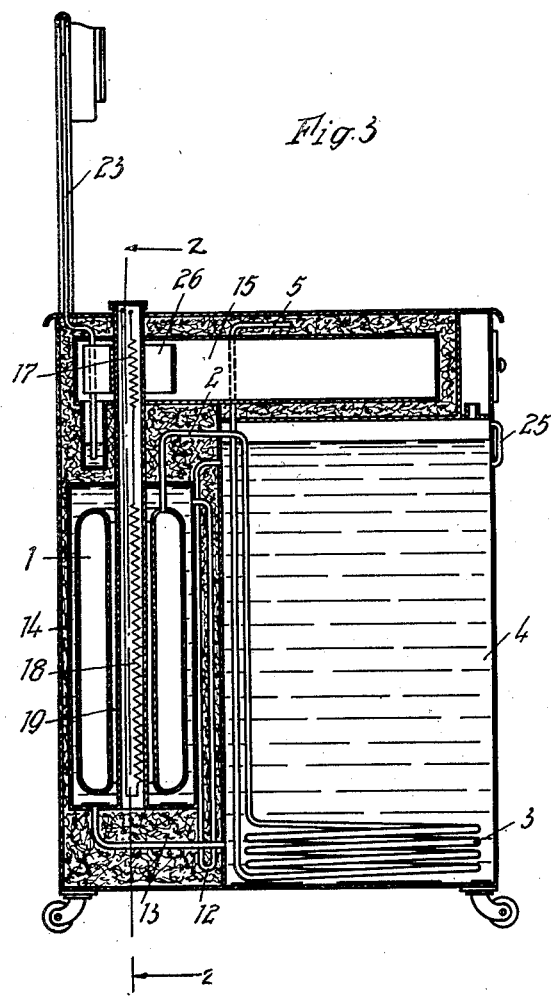
Fig. 3 shows a longitudinal vertical section through the refrigerator on line 3—3 Fig. 2, the modification Figs. 2, 3 embodying the system shown in Fig. 1.

In Figs. 2 and 3 a practical type of the refrigerator described is shown. In these figures the parts also shown in Fig. 1 are marked with the same reference numbers as in Fig. 1. The outer walls of the refrigerator are best made of copper or aluminum. For the interior of the boiler I prefer to use aluminum or aluminum-plated iron which is best for this particular purpose because it can withstand the corrosive action of ammonia or of amines. For filling the boiler absorber, I use chloride of lime with ammonia or chloride of magnesium with ethylamine. Refrigerating chamber 34 is insulated against the outer walls by a layer of cork 30. The best cover for tank 6 is aluminum foil because this material has a lower specific heat than cork. It is also preferable to cover the air tank and the absorber tank with a material of lower specific heat, e. g., aluminum foil. As will be seen from Fig. 2, it is preferable to choose an oval liquid tank in order to make the best use of the space at disposal. 27 is a connecting tube leading from cooling jacket 14 to air tank 15.

To ensure good conducting away of heat, the air-cooled auxiliary liquid tank 4 can be ribbed or covered with corrugated iron having uninterrupted channels containing good conductors of heat with large surfaces, or it may be equipped with any other arrangements for increasing the cooling surface. Condenser 3 can be conducted round tank 4 in such a manner that the heat is conducted so that nothing can happen to the refrigerator if tank 4 begins to leak because the condenser is well cooled by the air in such a case.

For regulating the temperature in such a refrigerator, a time switch 32 is used, which determines the boiling period and the periods between boilings. The boiler and the accessorial apparatus are best made of such size that a boiling and absorbing period lasts eight hours. In such a case the refrigerator can be worked with cheap night current which is generally available from 8 P. M. to 6 A. M. and from 12 A. M. to 1.30 P. M. in order to assist in equalizing the load of the power stations during the night and at noon. It is therefore best to have the first boiling period between 8 P. M. and 9.30 P. M., and the second from 4.30 P. M. to 6 P. M, and the third from 12 noon to 1.30 P. M.

In order to cut down the operating expenses of the refrigerator, it is advisable to provide a thermostat in the refrigeration chamber which interrupts the heating circuit actuated by time switch 32 when the temperature drops below a certain minimum so that a boiling period can either be shortened or even be omitted. The thermostat can also cut in a special heating winding in the air tank during the absorption period so that the air can be heated and, on expanding, can interrupt the circulation of the liquid between absorber tank 14 and tank 4 so that the referigerating efficiency is reduced. Such an arrangement is shown in Fig. 1 of the drawings in which the thermostat 33 of an auxiliary heating circuit is arranged in the cooling chamber. As will be noted, the heating coil 18 of the absorber-generator is connected in series with the heating coil 17 of the gas pressure tank 15, in turn connected to the supply circuit consisting of the conductors 37, 38, through the contact making clock 32. The heating circuit leads to a contact 34 of the thermostat. Contact 34 is closed if the temperature in the cooling chamber stands above or reaches a predetermined value. In case the temperature in the cooling chamber drops below this value, the heating circuit will be interrupted at the contact 34. Consequently, even if the contact making clock closes its own contacts, no heating current will flow through the heating circuit as long as the temperature in the cooling chamber is still sufficiently low. As soon as the temperature drops below a given value, the contact 35 of the thermostat 33 is closed, thereby connecting an auxiliary heating coil 36 directly to the supply circuit 37, 38. The auxiliary heating coil 36, as above described, is disposed in the pressure tank 15 and the auxiliary heating coil acts to cause the gas pressure in the tank 15 to increase to such an extent as to interrupt the circulation of the liquid. The dimensions of cooling jacket 14, air tank 15, and the heating elements 17 and 18 should be such that when air is expelled through pipe 13 because of the pressure increase accompanying the boiling, the quantity of air expelled is very much greater (perhaps twice as much) than the volume of liquid pushed out of cooling jacket 14. There is then a certain guarantee that, during the absorption period, the cooling of the air results in a reduction of volume which is great enough to permit of rapid circulation of the auxiliary liquid, beginning lively so that no stopping of the refrigerator is to be feared. Liquid tank 4 is provided with a water gauge glass 25 so that one can always see that the right quantity of liquid required for operating the refrigerator is in the tank.

The time switch, which may be of any approved and known construction, not shown here, is best fixed to the back of the refrigerator. Its construction is such that one of its legs serves as a support for pipe 23 coming from tank 15.

In order to simplify packing the refrigerator described, it is best to see that the time switch can be turned down to a horizontal position on the top of the refrigerator. In this case the line 23 must be flexible.

Fig. 4 shows a further modification of the construction. The latter differs from that of Figs. 1 and 3 inasmuch as here the superfluous air is not pushed out into the open when it expands, but into a special tank from which it can emanate for the purpose of compensating when the vacuum in the air tank makes itself felt. In a manner similar to that described in the case of the refrigerator shown in Fig. 1, the auxiliary liquid is pressed out of cooling jacket 114 surrounding the boiler absorber 101 and into tank 104 through pipe 113 and cooling coil 147 when the air in tank 115 expands. A pipe 116 leads from air tank 115 to the lower part of this tank 104. The air escapes through this pipe when the pressure in tank 115 exceeds the value corresponding to the active head "$h$" of the liquid in tank 104 and standing over the mouth of pipe 116. The air expelled into tank 104 passes thence into closed air tank 140, arranged above tank 104 and being connected by a pipe 123 to liquid seal 122 provided at the bottom of tank 115.

A heat conducting bridge 154 made of a material with good heat conducting qualities (copper, for instance) connects boiler absorber 101 with the liquid seal. This bridge prevents all damage to the refrigerator due to accidental continuation of the heating period, for instance if anything goes wrong with the time switch. In this case the heat due to the impermissible increase of temperature of the boiler is rapidly conducted to the liquid seal so that the liquid contained in the latter evaporates thus rendering a compensation possible between air tank 115 and tank 140 which permits the auxiliary liquid to re-enter cooling jacket 114.

At the beginning of the boiling period, the compressed air in tank 140 is conducted to the cooling jacket through pipe 123. When boiling is over, liquid seal 122 is filled again through this pipe. During the absorption period the auxiliary liquid circulates between cooling jacket 114 and tank 104, running through pipes 112 and 113. Thus the heat liberated is conducted away.

A special circulation of a cooling medium is provided in order to lower the temperature of the auxiliary liquid. For this purpose cooling coil 147 and tank 104 are placed in a vessel 148. The latter is connected at the top with the top of condenser 151 by pipeline 150 and at the bottom with the bottom of the condenser tank by pipeline 149. The heat liberated during the absorption process is passed to the cooling liquid in tank 148 by cooling coil 147. The cooling liquid circulates thus giving the heat off to condenser tank 151. The refrigerant line 102 coming from the boiler enters the condenser tank and passes on to vessel 106 with evaporation coil 107.

In the refrigeration chamber there is a gas thermostat vessel 141 which is connected to a vessel 143 by a tube 142. The auxiliary liquid is supplied into vessel 143 from vessel 104 and through tube 144 by suction, due to contraction of the gas volume in vessel 141 when the temperature drops. Liquid is thus moved from vessel 104 to vessel 143, or vice versa, depending upon the temperature in the refrigeration chamber. The entrance to vessel 141 is controlled by a valve 157 which is controlled in turn by a liquid in a closed sylphon bellows thermostat chamber 158 contained in vessel 141, in such manner that the valve does not open till the temperature in the refrigeration chamber drops below a certain value (+6 degrees centigrade, for instance). With the aid of a screw 159, the actuating temperature of the valve can be adjusted.

When the temperature drops below this actuating value, the lowered gas pressure in vessel 141 draws sufficient auxiliary liquid from tank 104 to lower the liquid level therein and to interrupt its circulation between cooling jacket 114 and tank 104 through pipe 112. As will be seen from the drawings, it is best to flatten pipe 112 at the point where it enters tank 104 so that the liquid is forced through a long narrow vertical slit. Thus, when the level of the auxiliary liquid in tank 104 is lowered, its circulation is gradually reduced so that the effect of the cold is gradually lessened.

As long as valve 157 of thermostat vessel 141 is closed, the variations in pressure manifesting themselves in air tank 140 during the absorption period cannot influence the circulation of the auxiliary liquid between tank 104 and absorber cooling jacket 114 because the normal level of the liquid in tank 104 is somewhat higher than that corresponding to the beginning of the interruption of the circulation. When, however, the temperature in the refrigerator has dropped to such a degree that valve 157 opens, the increasing pressures in air tank 140 will result in the level of the liquid in tank 104 dropping till it reaches the aperture of pipe 144 so that an equalization of pressure can take place between tank 140 and thermostat vessel 141. As the circulation of the auxiliary liquid is simultaneously interrupted thereby, the reduction in the effect of the cold results in a gradual rising of temperature in the refrigeration chamber, so that the auxiliary liquid is pressed out of tank 143 into tank 104 whereupon circulation re-commences.

It is advisable to have the difference between the level prevailing when the circulation of the auxiliary liquid is completely interrupted and the level at which equalizing of the pressure takes place between air tank 140 and thermostat vessel 141 (this difference is marked "a" in the drawings) as small as possible. This difference "a" can, for instance, be chosen so great that the volume of liquid it embraces corresponds to a temperature drop of 1 degree centigrade in the refrigeration chamber. The cooling action of the auxiliary liquid on the absorber must not cause a greater production of cold when the auxiliary liquid circulation is interrupted than corresponds to the drop in temperature necessary to render possible the equalizing of pressure between air tank 140 and thermostat vessel 141.

A float which adjusts itself in accordance with the liquid level in tank 104 controls a switch 146 in the heating circuit of time switch 132. The switch controlled by the float breaks the heating circuit when the temperature in the refrigerating chamber drops below a certain value.

Regulating equipment acting on the principle of interrupting the auxiliary liquid circulation as described above can be used for all refrigerators working with circulating liquid for neutralizing the heat liberated by the absorbing.

Figs. 5 and 6 show a practical type of the refrigerator just described. These illustrations show how the different parts are arranged in a domestic refrigerator. The numbers indicating the different parts are the same as in Fig. 4. The boiler absorber 101 (contained in the jacketing vessel 114) and air tank 115 are in the lower part of the refrigerator cabinet. Above them it is best to have a double air insulation 155 so that the heat generated in the boiler cannot be conducted to the refrigerating chamber just above. Condenser tank 151 is disposed in the upper part of the cabinet and is also separated from the refrigerating chamber by a corresponding layer of air 156. These air insulation chambers are vented to the outside so that warm air cannot accumulate in them.

In the case of the refrigerators described above, undesired cutting in of the heating apparatus when the quantity of liquid in the auxiliary liquid tank 104 decreases for some reason or other (leaking, for instance) can be prevented by a float put into this tank. The float interrupts the heating circuit when the liquid level drops below a certain permissible minimum value.

Both in the case of the refrigerator shown in Fig. 1 and that of Fig. 4, it is advantageous to dispense with tank 15 or 115 respectively for producing the pressure and to substitute a tank for it in which there is an adsorption medium as, for instance, active carbon containing adsorbed air, or also, silicic acid, etc. or any other adsorption medium which is able to produce or emanate a gas, inert with respect to the auxiliary liquid. These absorption or adsorption media are best placed on plates or other objects used in the absorbers of refrigerators operating with solid absorption materials. The use of such media in the tank necessary for producing the pressure is very advantageous inasmuch as the containers can be made very much smaller than those only operating with air or any other gas. In the pressure tank 140 I may use the same substance as may be employed as an auxiliary liquid in the cooling jacket 114 of the boiler absorber. For instance water with silica-gel could be used in the gas pressure tank. In this case the tank must be highly evacuated.

According to the same principle gas thermostat 141 of Fig. 4 can operate with absorption or adsorption substances in the manner described.

Fig. 7 shows another, different modification of this type of refrigerator. In this case the auxiliary liquid used is pushed away from the heat exchanging surfaces of the solid absorption substances by its own steam pressure during the expelling period. 201 is the boiler absorber which is heated by a coil in heating tube 202. From the boiler absorber a pipe 204 leads to condenser 205. The latter is disposed in a vessel 206 which is preferably filled with a solid substance whose fusing point is somewhere between 40 and 60 degrees centigrade. For this purpose I may use sodium phosphate containing water of crystallization, or any other product with a relatively high fusing temperature and whose fusing point is somewhere between 40 to 60 degrees centigrade. From condenser 205 a pipe 207 leads to refrigerant condensate tank 208 to which is connected evaporator coil 210. A pipe 212 is connected to the bottom of the latter. This pipe can be connected with a boiling tank not shown in the drawings. Evaporator coil 210 is in cold accumulator 219 which protrudes into refrigerating chamber 209. Cold accumulator 219 contains an ice freezing compartment, indicated by a central rectangle. Evaporator coil 210 is laid against the walls of this compartment.

Boiler absorber 201 is surrounded by cooling jacket 203. 216 is a tank for the auxiliary liquid. The latter circulates through pipes 214 and 215 during the absorbing period. Tank 216 is disposed in tank 206 in such a manner that the heat conducted away from the absorber boiler by the circulating of the auxiliary liquid during the absorbing period is partly communicated to the salt in tank 206. The latter tank in turn is located in a tank 213 partly filled with water and also containing a ring of porous clay 217. The arrangement of this ring is such that it constitutes the continuation of tank 213. It is covered with sheet copper 218.

In order to render possible good transmission of heat from the heating pipe 202 to the boiler absorber, a corrugated iron radiator 222 is placed round the heating pipe. This radiator conducts the heat to the inner walls of the boiler to which it is connected.

When the refrigerator is put into operation by closing the circuit through the electric heating unit 218, the boiler absorber is heated. Simultaneously the water in cooling jacket 203 and which, for the moment, completely fills the latter, begins to get warm. As soon as the temperature rises to more than 100 degrees centigrade, a low steam pressure is manifested in cooling jacket 203. The steam pushes the water from the jacket into tank 216 through pipe 214. Pipe 215 enters the upper portion of the cooling jacket at such a level that, when the boiling begins, the circulation of the auxiliary liquid between cooling jacket 203 and tank 216 is interrupted by the steam raising. When the greater part of the water in the cooling jacket has been expelled into tank 216, a state of equilibrium is reached because the walls of the cooling jacket which are comparatively lightly insulated against the outer air conduct away the same amount of heat as the water receives with its reduced contact surface of the heating tube 202. The pressure cannot, therefore, continue to increase in the cooling jacket.

Compared with the volume of water in tank 216, the volume of water in the cooling jacket 203 is rather small so that removing the water from the cooling jacket does not result in an appreciable raising of the water level in tank 216. The refrigerator is also protected against the dangers of overheating. If, for instance, accidently the heat supply fails to shut off in time, which would result in the steam pressure in cooling jacket 203 overcoming the counter-pressure of the liquid column between the water level of the liquid left in the cooling jacket 203 and the level of the water in vessel 216, steam escapes to tank 216 through pipe 215 so that the pressure in vessel 203 drops so that water can again flow back into the cooling jacket through pipe 214. The water level in the cooling jacket therefore rises and more steam is raised because the heating surface has been increased so that, in such a case, a state of equilibrium is obtained.

As soon as the boiling is over which, in the case of electric heating, is determined by a time switch, in case of petrol heating by the size of the fuel tank, the steam pressure in cooling jacket 203 rapidly drops below atmospheric pressure so that the jacket again fills with water. This water is hot and circulates through pipes 214 and 215 between cooling jacket 203 and tank 216. If heating is effected with petrol, a closed heating pipe ending in a small steam boiler is used instead of heating winding 218. The water evaporated by the burning petrol condenses in the heating tube imparting its heat of condensation to the boiler.

By the circulation of auxiliary liquid during the absorbing period, the boiler absorber 201 is cooled from outside and from inside. The heat of absorption is conducted to tank 216 by the circulating water. The latter imparts some of the heat directly to the outer air by means of the tank walls which are accessible to the outer air, and some of its heat is transmitted indirectly to the water in tank 213. The heat received by the liquid in this tank is partly dissipated into the outer air through the walls of the tank, partly it is conducted away by the clay ring 217 which absorbs water which later evaporates into the air surrounding the ring. The heat of evaporation cools clay ring 217 which imparts this cooling to the water in tank 213 by way of the copper lining.

The heated water in tank 213 can be tapped for household purposes by means of tap 220. For filling up, cold water is introduced which is effected with the aid of water mains 226 and an automatically-acting float control 225 which operates when the water level drops below a certain level in tank 213.

The heat of condensation is taken up by the salt in tank 206. It is imparted to the air outside partly by the water in tanks 213 and 216 and partly by the wall portions of tank 206 which are exposed to the action of the air. The surface of tank 206 is for this reason of such dimensions that it alone suffices for conducting away the heat even if, for some reason, the tanks 213 and 216 should be empty. No dangerous increase of pressure can therefore take place in condenser 205. Further, the heat conducting parts of tank 213 are so dimensioned that they can conduct away the heat received even if no hot water is withdrawn and replaced by cold water.

By cooling the boiler absorber 201, the latter is again rendered capable of absorbing. The tank 208, insulated against heat, contains liquid ammonia which is re-absorbed in boiling. The evaporating heat required for this purpose is withdrawn by the evaporating coil 210, partly emanating from the glycerine solution which simultaneously freezes, partly coming from the container in which ice is produced. The frozen glycerine solution thus cools the refrigerating chamber 209 through the walls of tank 219. The temperature of the refrigerating chamber is kept constant because the heat capacity of the melting accumulator is so great that the frozen glycerine solution does not melt completely during the boiling period. 227 is the time switch for limiting the boiling period. It is connected to the mains by lines 229, 230. Lines 231, 232 lead to heating unit 218. A safety switch 228 controlled by float 225 breaks the heating circuit when the water level in vessel 213 drops below the permissible minimum.

In the case of the refrigerator shown in Fig. 7, several possibilities of conducting the heat of absorption and condensation to the air are shown. It will be seen from the illustration that the heat of absorption is dissipated directly to the air by the circulating auxiliary liquid. A second possibility consists in transmitting the heat of absorption to the water in tank 213 by means of the auxiliary liquid. In tank 213 the heat is conducted away to the air by the walls of the tank. It is, however, also possible to use a special melting accumulator and to transmit the heat of absorption either directly to the air, or to the auxiliary liquid in tank 213 which, in its turn, transmits the heat to the air.

In a similar manner the heat of condensation can be transmitted directly to the air by the melting accumulator or to a special auxiliary liquid communicating with the melting accumulator and which in turn transmits the heat to the air. For conducting away the heat to the air, it is possible, in all these cases, to use either good heat conducting materials for the tank walls, or special means of conducting away heat by evaporating liquids. Finally it is possible to dispose of the heat of condensation and absorption either by taking out hot water or, partly, by one of the air cooling methods described.

These modes of conducting away heat shown in Fig. 7 can either be used singly or in any combination for forces of refrigerators, shown in the earlier described modifications.

In refrigerators, especially when they have not been in use for a considerable time, there exists the danger of bacteria growing in the auxiliary liquids if fresh water water is not continuously introduced. To prevent this and, subsequently, to avoid the water becoming stagnant and imparting a disagreeable smell, an oligodynamic process of sterilization can be adopted, such as is for instance described in British Patent No. 279,085 which details a process of sterilizing water and other liquids. For the purpose in view, balls of porcelain which are covered with a layer of silver or copper are introduced in the tanks. In Fig. 7 such balls are shown at 233 in vessel 216. A perforated cap 234 is placed over the outlet of pipe 214 to prevent the balls from obstructing pipe 214.

The system of operating absorption refrigerators described above is especially adapted to refrigerators working with solid absorbing substances. Substances of this kind are, for instance, ammonia and amine with chloride of calcium, chloride of strontium, chloride of magnesium, chloride of lithium, and other haloid combinations which, with ammonia and amines, form solid chemical substances.

The means shown in Fig. 7 for removing the auxiliary liquid from the boiler absorber can be used to advantage when the heat liberated in the absorber is conducted directly from the cooling jacket of the boiler to the air by means of an auxiliary liquid in the cooling jacket.

It is of advantage to add alcohol, glycerine, etc. to the cooling liquids in order to lower the freezing point so that the machine cannot be damaged if the outside temperature is very low.

I claim:

1. An intermittently operating absorption machine, comprising an evaporator, a boiler-absorber containing a solid absorbent forming a chemical compound with the refrigerant of the machine and maintaining its solid form during the different stages of the refrigeration process, means for circulating the refrigerant between said absorber and evaporator, means for heating said absorber, and means for cooling said absorber, comprising a heat accumulator containing a liquid and having means for continuously dissipating heat to the surrounding atmosphere, and an auxiliary liquid circulating system arranged between said accumulator and said absorber, for conveying the heat of absorption developed in the absorbent to said accumulator, the liquid in said circulating system being different from the liquid contained in said accumulator vaporizable at the boiling temperature of the boiler-absorber, but being under sufficient pressure to retain its liquid state at the absorption temperature of said absorber, and means for trapping sufficient vapor developed from said liquid to expel the liquid from heat absorbing contact with said boiler-absorber.

2. An intermittently operating absorption machine, comprising an evaporator, a boiler-absorber containing a solid absorbent forming a chemical compound with the refrigerant of the machine and maintaining its solid form during the different stages of the refrigeration process, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, said circulating system including fluid containing means in heat exchange relation with said boiler-absorber and a liquid circulating pipe between said means and said heat accumulator and being connected near the upper end of said means and having first a downward and then an upward direction before it enters the accumulator, and a liquid return pipe leading from the accumulator to the said fluid containing means, whereby the vapor developed from said liquid during the boiling period of the boiler-absorber expels the liquid from the jacket and interrupts the liquid circulation between the fluid containing means and the accumulator.

3. An intermittently operating absorption machine, comprising an evaporator, a boiler-absorber containing a solid absorbent forming a chemical compound with the refrigerant of the machine and maintaining its solid form during the different stages of the refrigeration process, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, and a pressure vessel containing a gaseous medium and being connected with said circulating system and means for developing sufficient pressure in said vessel for expelling sufficient liquid from said circulating system to interrupt the liquid circulation.

4. An intermittently operating absorption machine, comprising an evaporator, a boiler-absorber containing a solid absorbent forming a chemical compound with the refrigerant of the machine and maintaining its solid form during the different stages of the refrigeration process, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, and a pressure vessel containing a gaseous medium and being connected with said circulating system, and means for developing sufficient pressure in said vessel during the heating period of the boiler-absorber for removing the circulating liquid from heat absorbing contact with said boiler-absorber.

5. An intermittently operating absorption machine, comprising an evaporator, a boiler-absorber containing a solid absorbent forming a chemical compound with the refrigerant of the machine and maintaining its solid form during the different stages of the refrigeration process, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, and a pressure vessel containing a gaseous medium and being connected with said circulating system and means for heating and expanding said medium during the heating period of the boiler-absorber to expel sufficient liquid from said circulating system to interrupt the liquid circulation and the heat absorption by the liquid from said boiler-absorber.

6. An intermittently operating absorption machine, comprising an evaporator, a boiler-absorber containing a solid absorbent forming a chemical compound with the refrigerant of the machine and maintaining its solid form during the different stages of the refrigeration process, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, said circulating system including a jacket surrounding said boiler-absorber and circulating pipe connections between said jacket and said accumulator and a pressure vessel containing a gaseous medium and being connected with said jacket, and means for expanding said medium for expelling the liquid in said jacket into said accumulator.

7. An intermittently operating absorption machine, comprising an evaporator, a boiler-absorber containing a solid absorbent forming a chemical compound with the refrigerant of the machine and maintaining its solid form during the different stages of the refrigeration process, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, said circulating system including a jacket surrounding said boiler-absorber and circulating pipe connections between said jacket and said accumulator, and a pressure vessel containing a gaseous medium and being connected with said jacket, means for heating and expanding said medium to expel sufficient liquid from said jacket to interrupt the liquid circulation and the heat absorption by the liquid from said boiler-absorber, and a receiving vessel connected with said accumulator to receive any excess amount of gaseous medium expelled from said pressure vessel through said jacket.

8. An intermittently operating absorption machine, comprising an evaporator, a boiler-absorber containing a solid absorbent forming a chemical compound with the refrigerant of the machine and maintaining its solid form during the different stages of the refrigeration process, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, said circulating system including a jacket surrounding said boiler-absorber and circulating pipe connections between said jacket and said accumulator, and a pressure vessel containing a gaseous medium and being connected with said jacket, means for heating and expanding said medium to expel sufficient liquid from said jacket to interrupt the liquid circulation and the heat absorption by the liquid from said boiler-absorber, and a receiving vessel connected with said accumulator to receive any excess amount of gaseous medium expelled from said pressure vessel through said jacket, and a pipe connection between said pressure and said receiving vessel and trapping means in said connection for permitting medium flow only from the receiving vessel to the pressure vessel.

9. An intermittently operating absorption machine, comprising an evaporator, a boiler-absorber containing a solid absorbent forming a chemical compound with the refrigerant of the machine and maintaining its solid form during the different stages of the refrigeration process, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, said circulating system including a jacket surrounding said boiler-absorber and circulating pipe connections between said jacket and said accumulator, and a pressure vessel containing a gaseous medium and being connected with said jacket, means for heating and expanding said medium to expel sufficient liquid from said jacket to interrupt the liquid circulation and the heat absorption by the liquid from said boiler-absorber, and a receiving vessel connected with said accumulator to receive any excess amount of gaseous medium expelled from said pressure vessel through said jacket, and a pipe connection between said pressure and said receiving vessel, and a liquid seal in said connection for permitting medium flow only from the receiving vessel to the pressure vessel, and being arranged to receive its required liquid supply from said jacket, when the latter is filled with its normal content of liquid.

10. An intermittently operating absorption machine, comprising an evaporator, a boiler-absorber containing a solid absorbent forming a chemical compound with the refrigerant of the machine and maintaining its solid form during the different stages of the refrigeration process, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, said circulating system including a jacket surrounding said boiler-absorber and circulating pipe connections between said jacket and said accumulator, and a pressure vessel containing a gaseous medium and being connected with said jacket, means for heating and expanding said medium to expel sufficient liquid from said jacket to interrupt the liquid circulation and the heat absorption by the liquid from said boiler-absorber, and a receiving vessel connected with said accumulator to receive any excess amount of gaseous medium expelled from said pressure vessel through said jacket, and a pipe connection between said pressure and said receiving vessel, and a liquid seal in said connection for permitting medium flow only from the receiving vessel to the pressure vessel, and being arranged to receive its required liquid supply from said jacket, when the latter is filled with its normal content of liquid, and means for conveying heat from said boiler-absorber during its boiling period to said seal for evaporating some of its liquid content in case of excessive heat supply to the boiler-absorber, for breaking said seal to permit the return of at least some of the auxiliary liquid to the jacket.

11. An intermittently operating absorption machine, comprising an evaporator, a boiler-absorber containing a solid absorbent forming a chemical compound with the refrigerant of the machine and maintaining its solid form during the different stages of the refrigeration process, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, said circulating system including a jacket surrounding said boiler-absorber and circulating pipe connections between said jacket and said accumulator, and a pressure vessel containing a gaseous medium and being connected with said jacket, means for heating and expanding said medium to expel sufficient liquid from said jacket to interrupt the liquid circulation and the heat absorption by the liquid from said boiler-absorber, and an open receiving vessel connected with said accumulator to receive any excess amount of gaseous medium expelled from said pressure vessel through said jacket.

12. An intermittently operating absorption machine, comprising an evaporator, a boiler-absorber containing a solid absorbent forming a chemical compound with the refrigerant of the machine and maintaining its solid form during the different stages of the refrigeration process, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system including said accumulator, a jacket surrounding said boiler-absorber for conveying the heat of absorption developed in the absorbent to said accumulator and means for expelling auxiliary liquid from said jacket into said accumulator during the boiling period, said outside heating means including a current supply circuit, a boiler-absorber heating element and a switch for controlling the circuit, and a float in said accumulator connected to said switch to open it when the liquid in the accumulator falls below a predetermined value during the boiling period.

13. An intermittently operating absorption machine, comprising an evaporator, a boiler-absorber containing a solid absorbent forming a chemical compound with the refrigerant of the machine and maintaining its solid form during the different stages of the refrigeration process, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, and a gas thermostat arranged in the space cooled by said evaporator and comprising a thermostat vessel, containing an adsorption substance and an auxiliary gas adsorbed and liberated in accordance with the temperature variations in said space, and means responsive to the pressure produced by said auxiliary gas for interrupting the auxiliary liquid circulation when the space temperature drops below a desired minimum value.

14. An intermittently operating absorption machine, comprising an evaporator, a boiler-absorber containing a solid absorbent forming a chemical compound with the refrigerant of the machine and maintaining its solid form during the different stages of the refrigeration process, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, and a gas thermostat arranged in the space cooled by said evaporator and comprising a thermostat vessel, containing an adsorption substance and an auxiliary gas adsorbed and liberated in accordance with the temperature variations in said space, a valve in said thermostat vessel for controlling the passage of auxiliary gas into and out of said vessel, a temperature responsive element in said vessel for actuating the valve in accordance with the temperature variations of the space to be cooled, and means responsive to the pressure produced by said auxiliary gas for interrupting the auxiliary liquid circulation when the cooling space temperature drops below a desired minimum value.

15. An intermittently operating absorption machine, comprising an evaporator, a boiler-absorber containing a solid absorbent forming a chemical compound with the refrigerant of the machine and maintaining its solid form during the different stages of the refrigeration process, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, and a gas thermostat arranged in the space cooled by said evaporator and comprising a thermostat vessel, containing an adsorption substance and an auxiliary gas adsorbed and liberated in accordance with the temperature variations in said space, a valve in said thermostat vessel for controlling the passage of auxiliary gas into and out of said vessel, a temperature responsive element in said vessel for actuating the valve in accordance with the temperature variations of the space to be cooled, and means responsive to the pressure produced by said auxiliary gas for interrupting the auxiliary liquid circulation when the cooling space temperature drops below a desired minimum value, and means for adjusting the point of response of said temperature responsive element.

16. An intermittently operating absorption machine, comprising an evaporator, a boiler-absorber containing a solid absorbent forming a chemical compound with the refrigerant of the machine and maintaining its solid form during the different stages of refrigeration process, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, said circulating system including a jacket surrounding said boiler-absorber and circulating pipe connections between said jacket and said accumulator, and a pressure vessel connected with said jacket and containing an adsorption substance and an auxiliary gas adsorbed and liberated in accordance with the temperature prevailing in said vessel, and means for heating said vessel during the boiler heating period for liberating said auxiliary gas to develop a pressure whereby the auxiliary liquid circulation between said jacket and said accumulator is interrupted.

17. A refrigerating apparatus as claimed in claim 4, in which the means for developing sufficient pressure in the pressure vessel comprises a main and an auxiliary heating coil disposed in said vessel whereby when the cooling temperature drops below a predetermined value the circulation in the auxiliary liquid circulation system will be interrupted.

18. An intermittently operating absorption machine, comprising an evaporator, a boiler-absorber, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, said circulating system including fluid containing means in heat exchange relation with said boiler-absorber and a liquid circulating pipe between said means and said heat accumulator and being connected near the upper end of said means and having first a downward and then an upward direction before it enters the accumulator, and a liquid return pipe leading from the accumulator to the said fluid containing means, whereby the vapor developed from said liquid during the boiling period of the boiler-absorber expels the liquid from the said fluid containing means and interrupts the liquid circulating between the fluid containing means and the accumulator.

19. An intermittently operating absorption machine, comprising an evaporator, a boiler-absorber, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, and a pressure vessel containing a gaseous medium and being connected with said circulating system and means for developing sufficient pressure in said vessel for expelling sufficient liquid from said circulating system to interrupt the liquid circulation.

20. An intermittently operating absorption machine, comprising an evaporator, a boiler-absorber, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, and a pressure vessel containing a gaseous medium and being connected with said circulating system, and means for developing sufficient pressure in said vessel during the heating period of the boiler-absorber for removing the circulating liquid from heat absorbing contact with said boiler-absorber.

21. An intermittently operating absorption machine, comprising an evaporator, a boiler-absorber, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, and a pressure vessel containing a gaseous medium and being connected with said circulating system and means for heating and expanding said medium during the heating period of the boiler-absorber to expel sufficient liquid from said circulating system to interrupt the liquid circulating and the heat absorption by the liquid from said boiler-absorber.

22. An intermittently operating absorption machine, comprising an evaporator, a boiler-absorber, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, said circulating system including a jacket surrounding said boiler-absorber and circulating pipe connections between said jacket and said accumulator and a pressure vessel containing a gaseous medium and being connected with said jacket, and means for expanding said medium for expelling the liquid in said jacket into said accumulator.

23. An intermittently operating absorption machine, comprising an evaporator, a boiler-absorber, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, said circulating system including a jacket surrounding said boiler-absorber and circulating pipe connections between said jacket and said accumulator, and a pressure vessel containing a gaseous medium and being connected with said jacket, means for heating and expanding said medium to expel sufficient liquid from said jacket to interrupt the liquid circulation and the heat absorption by the liquid from said boiler-absorber, and a receiving vessel connected with said accumulator to receive any excess amount of gaseous medium expelled from said pressure vessel through said jacket.

24. An intermittently operating absorption machine, comprising an evaporator, a boiler-absorber, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, said circulating system including a jacket surrounding said boiler-absorber and circulating pipe connections between said jacket and said accumulator, and a pressure vessel containing a gaseous medium and being connected with said jacket, means for heating and expanding said medium to expel sufficient liquid from said jacket to interrupt the liquid circulation and the heat absorption by the liquid from said boiler-absorber, and a receiving vessel connected with said accumulator to receive any excess amount of gaseous medium expelled from said pressure vessel through said jacket, and a pipe connection between said pressure and said receiving vessel and trapping means in said connection for permitting medium flow only from the receiving vessel to the pressure vessel.

25. An intermittently operating absorption machine, comprising an evaporator, a boiler-absorber, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, said circulating system including a jacket surrounding said boiler-absorber and circulating pipe connections between said jacket and said accumulator, and a pressure vessel containing a gaseous medium and being connected with said jacket, means for heating and expanding said medium to expel sufficient liquid from said jacket to interrupt the liquid circulation and the heat absorption by the liquid from said boiler-absorber, and a receiving vessel connected with said accumulator to receive any excess amount of gaseous medium expelled from said pressure vessel through said jacket, and a pipe connection between said pressure and said receiving vessel, and a liquid seal in said connection for permitting medium flow only from the receiving vessel to the pressure vessel, and being arranged to receive its required liquid supply from said jacket, when the latter is filled with its normal content of liquid.

26. An intermittently operating absorption machine, comprising an evaporator, a boiler-absorber, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, said circulating system including a jacket surrounding said boiler-absorber and circulating pipe connections between said jacket and said accumulator, and a pressure vessel containing a gaseous medium and being connected with said jacket, means for heating and expanding said medium to expel sufficient liquid from said jacket to interrupt the liquid circulation and the heat absorption by the liquid from said boiler-absorber, and a receiving vessel connected with said accumulator to receive any excess amount of gaseous medium expelled from said pressure vessel through said jacket, and a pipe connection between said pressure and said receiving vessel, and a liquid seal in said connection for permitting medium flow only from the receiving vessel to the pressure vessel, and being arranged to receive its required liquid supply from said jacket, when the latter is filled with its normal content of liquid, and means for conveying heat from said boiler-absorber during its boiling period to said seal for evaporating some of its liquid content in case of excessive heat supply to the boiler-absorber, for breaking said seal to permit the return of at least some of the auxiliary liquid to the jacket.

27. An intermittently operating absorption machine, comprising an evaporator, a boiler-absorber, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, said circulating system including a jacket surrounding said boiler-absorber and circulating pipe connections between said jacket and said accumulator, and a pressure vessel containing a gaseous medium and being connected with said jacket, means for heating and expanding said medium to expel sufficient liquid from said jacket to interrupt the liquid circulation and the heat absorption by the liquid from said boiler-absorber, and an open receiving vessel connected with said accumulator to receive any excess amount of gaseous medium expelled from said pressure vessel through said jacket.

28. An intermittently operating absorption machine, comprising an evaporator, a boiler-absorber, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, and a gas thermostat arranged in the space cooled by said evaporator and comprising a thermostat vessel, containing an adsorption substance and an auxiliary gas adsorbed and liberated in accordance with the temperature variations in said space, and means responsive to the pressure produced by said auxiliary gas for interrupting the auxiliary liquid circulation when the space temperature drops below a desired minimum value.

29. An intermittently operating absorption machine, comprising an evaporator, a boiler-absorber, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, and a gas thermostat arranged in the space cooled by said evaporator and comprising a thermostat vessel, containing an adsorption substance and an auxiliary gas adsorbed and liberated in accordance with the temperature variations in said space, a valve in said thermostat vessel for controlling the passage of auxiliary gas into and out of said vessel, a temperature responsive element in said vessel for actuating the valve in accordance with the temperature variations of the space to be cooled, and means responsive to the pressure produced by said auxiliary gas for interrupting the auxiliary liquid circulation when the cooling space temperature drops below a desired minimum value.

30. An intermittently operating absorption machine, comprising an evaporator, a boiler-absorber, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, and a gas thermostat arranged in the space cooled by said evaporator and comprising a thermostat vessel, containing an adsorption substance and an auxiliary gas adsorbed and liberated in accordance with the temperature variations in said space, a valve in said thermostat vessel for controlling the passage of auxiliary gas into and out of said vessel, a temperature responsive element in said vessel for actuating the valve in accordance with the temperature variations of the space to be cooled, and means responsive to the pressure produced by said auxiliary gas for interrupting the auxiliary liquid circulation when the cooling space temperature drops below a desired minimum value, and means for adjusting the point of response of said temperature responsive element.

31. An intermittently operating absorption machine, comprising an evaporator, a boiler-absorber, means for circulating the refrigerant between said absorber and evaporator, means for heating said absorber, and means for cooling said absorber, comprising a heat accumulator having means for continuously dissipating heat to the surrounding atmosphere, and an auxiliary liquid circulating system arranged between said accumulator and said absorber, for conveying the heat of absorption developed in the absorbent to said accumulator, said circulating system including a jacket surrounding said boiler-absorber and circulating pipe connections between said jacket and said accumulator, and a pressure vessel connected with said jacket and containing an adsorption substance and an auxiliary gas adsorbed and liberated in accordance with the temperature prevailing in said vessel, and means for heating said vessel during the boiler heating period for liberating said auxiliary gas to develop a pressure whereby the auxiliary liquid circulation between said jacket and said accumulator is interrupted.

32. A refrigerating apparatus as claimed in claim 20, in which the means for developing sufficient pressure in the pressure vessel comprises a main and an auxiliary heating coil disposed in said vessel whereby when the cooling temperature drops below a predetermined value the circulation in the auxiliary liquid circulation system will be interrupted.

33. An intermittently operating absorption machine, comprising an evaporator, a boiler-absorber, means for circulating the refrigerant between said absorber and evaporator, means for supplying outside heat to said absorber including a time switch for controlling the supply of the heating medium to the boiler-absorber at predetermined periods, means for cooling said absorber, said means including a circulating system in which a medium dissipates the heat of absorption to outside atmosphere, and means for controlling in accordance with the required amount of refrigeration the dissipation of heat of the boiler-absorber to the surrounding air during the absorption period as well as the supply of heat to the boiler-absorber during the heating period.

34. An intermittently operating absorption machine, comprising an evaporator, a boiler-absorber, means for circulating the refrigerant between said absorber and evaporator, means for supplying outside heat to said absorber including a time switch for controlling the supply of the heating medium to the boiler-absorber at predetermined periods, means for cooling said absorber, comprising a heat accumulator having means for continuously dissipating heat to the surrounding atmosphere, an auxiliary liquid circulating system arranged between said accumulator and said absorber for conveying the heat of absorption developed in the absorbent to said accumulator, and a thermostat responsive to the temperature in said evaporator and controlling in accordance with the required amount of refrigeration the dissipation of heat of the boiler-absorber to the surrounding air during the absorption period as well as the supply of heat to the boiler-absorber during the heating period.

35. An intermittently operating absorption apparatus, comprising an evaporator, a boiler-absorber, means for transmitting the refrigerant between said absorber and evaporator, means for cooling said absorber comprising a heat accumulator containing water and a second solid medium which melts upon taking up heat of absorption, said accumulator having means for continuously dissipating heat to the surrounding atmosphere and an auxiliary circulating system arranged between said accumulator and said absorber for conveying the heat of absorption to said accumulator, means for removing the heated water contained in said accumulator, and means for replenishing the removed water by cold water, said means for dissipating the heat from said accumulator to the surrounding atmosphere being so arranged and dimensioned that the total amount of the heat of absorption can be dissipated to the atmosphere if no water is removed from said accumulator.

36. An intermittently operating absorption apparatus comprising a cold producing part, a boiler-absorber, means for conveying the refrigerant from said boiler-absorber to said cold producing part and vice versa, a heating tube extending through said boiler-absorber and serving to supply heat, means for cooling said boiler-absorber comprising an auxiliary liquid circulating system which is closed against the outside, the part of said system which is in heat exchange relation with the boiler-absorber being designed as a cooling jacket closing the cylindrical walls of the generator-absorber against the outside, and means for forcing out said liquid heat transfer medium during the heating period from the cooling jacket.

37. An intermittently operating absorption apparatus comprising a cold producing part, a boiler-absorber, means for conveying the refrigerant from said boiler-absorber to said cold producing part and vice versa, a heating tube extending through said boiler-absorber and serving to supply heat, means for cooling said boiler-absorber comprising an auxiliary liquid circulating system which is closed against the outside, the part of said system which is in heat exchange relation with the boiler-absorber being designed as a cooling jacket closing the cylindrical walls of the generator-absorber against the outside, and means for forcing out said liquid heat transfer medium during the heating period from the cooling jacket, a control liquid being in said heat transfer system and under such a pressure that the transfer medium evaporates at the heating temperature of the boiler-absorber and remains in the liquid state at the temperature of absorption in the boiler-absorber.

38. An intermittently operating absorption apparatus comprising a cold producing part, a boiler-absorber, means for conveying the refrigerant from said boiler-absorber to said cold producing part and vice versa, a heating tube extending through said boiler-absorber and serving to supply heat, means for cooling said boiler-absorber comprising an auxiliary liquid circulating system which is closed against the outside, the part of said system which is in heat exchange relation with the boiler-absorber being designed as a cooling jacket closing the cylindrical walls of the generator-absorber against the outside, and means for forcing out said liquid heat transfer medium during the heating period from the cooling jacket, said means being so arranged that the vapor pressure of the heat transfer liquid forces the latter in in the generating period out of the cooling jacket of the boiler-absorber.

39. An absorption apparatus which serves at the same time to produce refrigeration and hot water comprising an evaporator, an absorber, a condenser, a cooling chamber and a water tank to which a supply conduit for fresh water and a delivery conduit for hot water are connected, said evaporator being in heat-exchange relation with said cooling chamber and the heat-radiating parts of the absorber with said water tank, the heat-dissipating surfaces of the condenser consisting of two parts, one of which radiates the heat to said water tank while the other part is in heat-exchange relation with the atmosphere.

40. An intermittently operating absorption apparatus which at the same time serves to produce refrigeration and hot water comprising a condenser, a generator-absorber, an accumulator for the liquefied refrigerant, an evaporator, a cooling chamber and a water tank to which are connected a supply conduit for fresh water and a delivery conduit for hot water, said accumulator being embedded in the cooling chamber insulation, said evaporator being located in the cooling chamber and connected to said accumulator by conduits, heat exchange means between said generator-absorber and said water tank, the heat-dissipating surfaces of the condenser consisting of two parts, one of which radiates the heat to said water tank while the other part is in heat exchange relation with the atmosphere.

WULFF BERZELIUS NORMELLI.